United States Patent [19]

Homma et al.

[11] Patent Number: 5,784,500
[45] Date of Patent: Jul. 21, 1998

[54] IMAGE BINARIZATION APPARATUS AND METHOD OF IT

[75] Inventors: Toru Homma, Kawaguchi; Koji Yura, Yokohama; Yoshikatu Nakamura, Yokosuka, all of Japan

[73] Assignee: Kabushiki Kaisha Toshiba, Kawasaki, Japan

[21] Appl. No.: 666,114

[22] Filed: Jun. 21, 1996

[30] Foreign Application Priority Data

Jun. 23, 1995 [JP] Japan ................. 7-157916

[51] Int. Cl.$^6$ ................. H04N 1/40
[52] U.S. Cl. ................. 382/270; 382/271; 358/466
[58] Field of Search ................. 358/466, 465, 358/463, 464, 447; 382/271, 270, 273

[56] References Cited

U.S. PATENT DOCUMENTS

| | | | |
|---|---|---|---|
| 4,656,665 | 4/1987 | Pennebaker | 358/466 |
| 4,982,294 | 1/1991 | Morton et al. | 358/466 |
| 5,130,821 | 7/1992 | Ng | 358/457 |
| 5,140,444 | 8/1992 | Klein et al. | 358/463 |
| 5,410,418 | 4/1995 | Yonezawa | 358/464 |
| 5,563,721 | 10/1996 | Overton | 358/465 |

FOREIGN PATENT DOCUMENTS

| | | |
|---|---|---|
| 6-152965 | 5/1994 | Japan . |
| 6-187495 | 7/1994 | Japan . |

*Primary Examiner*—Edward L. Coles, Sr.
*Assistant Examiner*—Fan Lee
*Attorney, Agent, or Firm*—Cushman, Darby & Cushman IP Group of Pillsbury, Madison & Sutro LLP

[57] ABSTRACT

A binarization circuit compares the density value of the target pixel with the density value of surrounding pixels in the vicinity. A judging unit judges whether or not the target pixel is isolated from the surrounding pixels. A detection unit detects the density values of the target pixels which make the target pixels isolated by a binarization process. A calculation unit calculates the accumulated isolated pixel frequencies of each density value detected by the detecting function when the judging unit and the detecting unit have finished processing all of the original image. A determination unit determines a threshold value on the basis of the accumulated isolated pixels frequencies.

20 Claims, 8 Drawing Sheets

| | FREQUENCY OF EACH DENSITY (DIFFERENTIAL VALUE) |
|---|---|
| g(0) | 1+1+1+1+1 |
| g(1) | 1+1+1-1+1+1-1+1 |
| g(2) | 1+1+1-1-1+1-1-1+1 |
| ⋮ | |
| g(K) | 1+1-1-1+1+1-1-1+1 ···· |
| ⋮ | |
| g(256) | -1-1-1-1-1-1-1 |
F I G. 4B
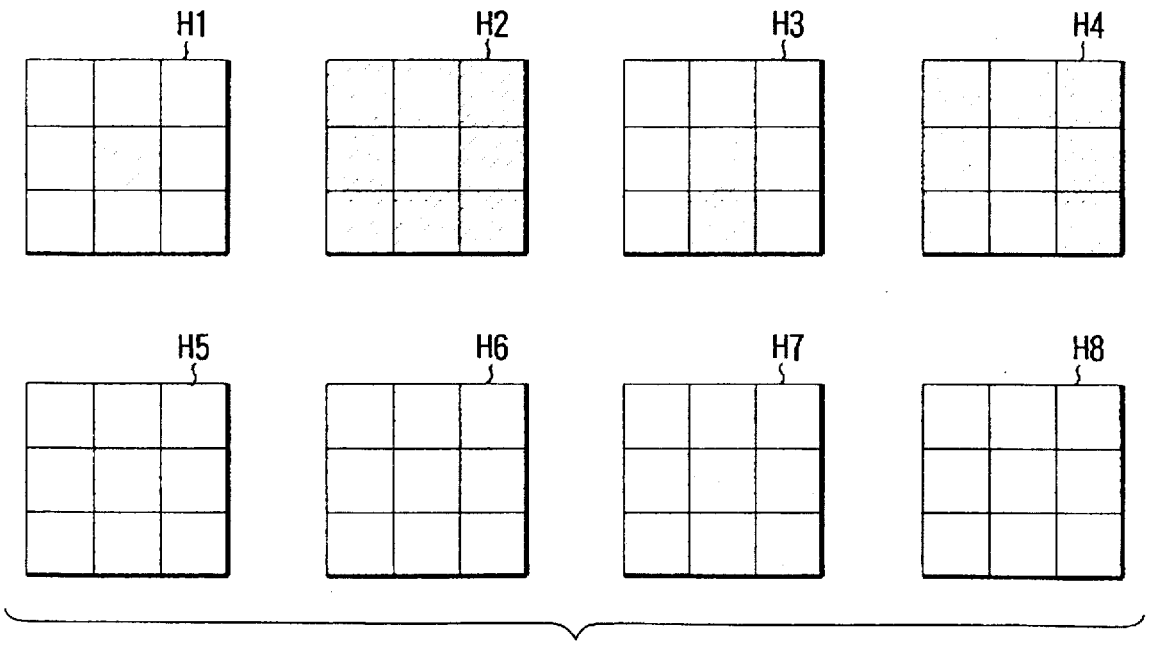
F I G. 5

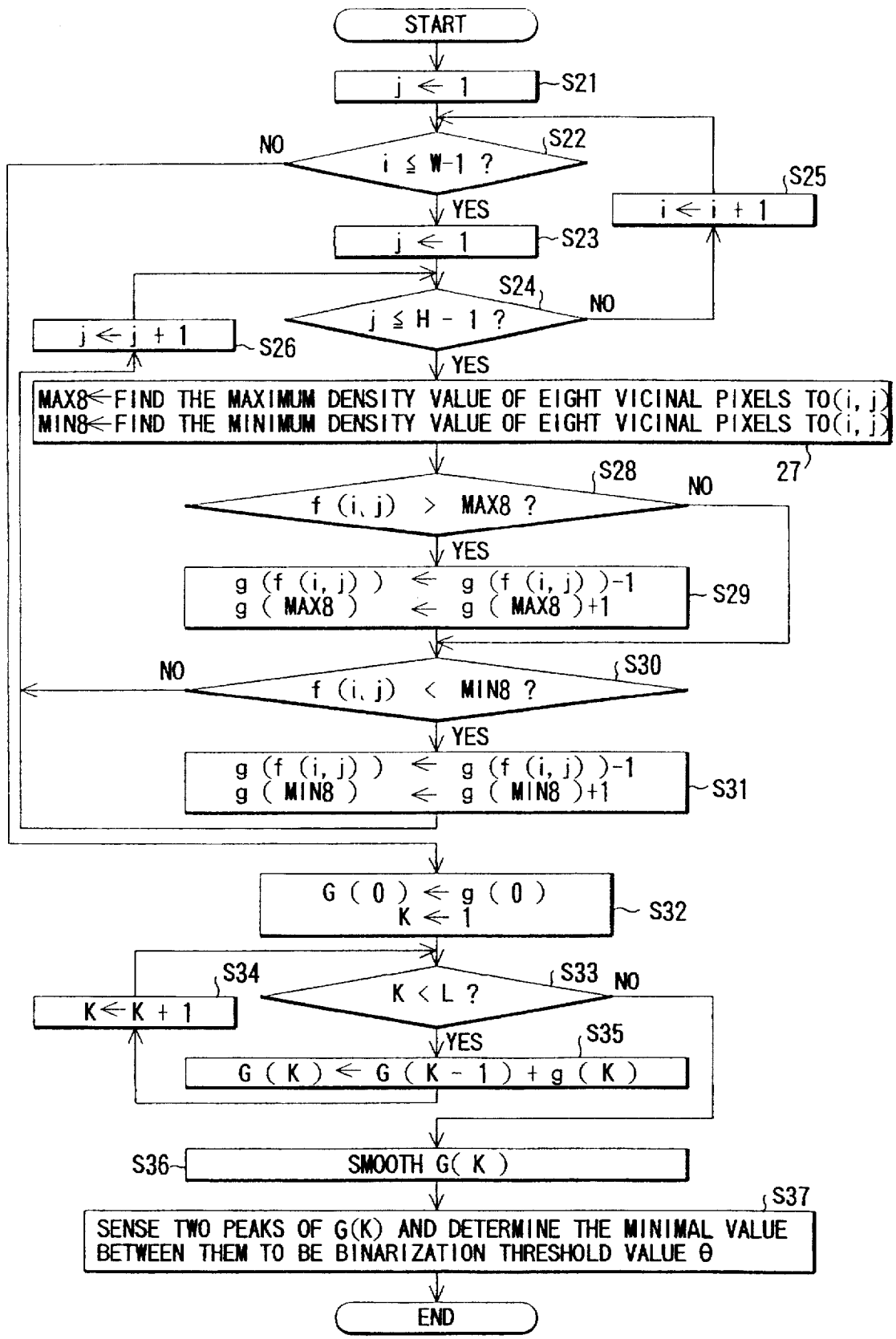
F I G. 8

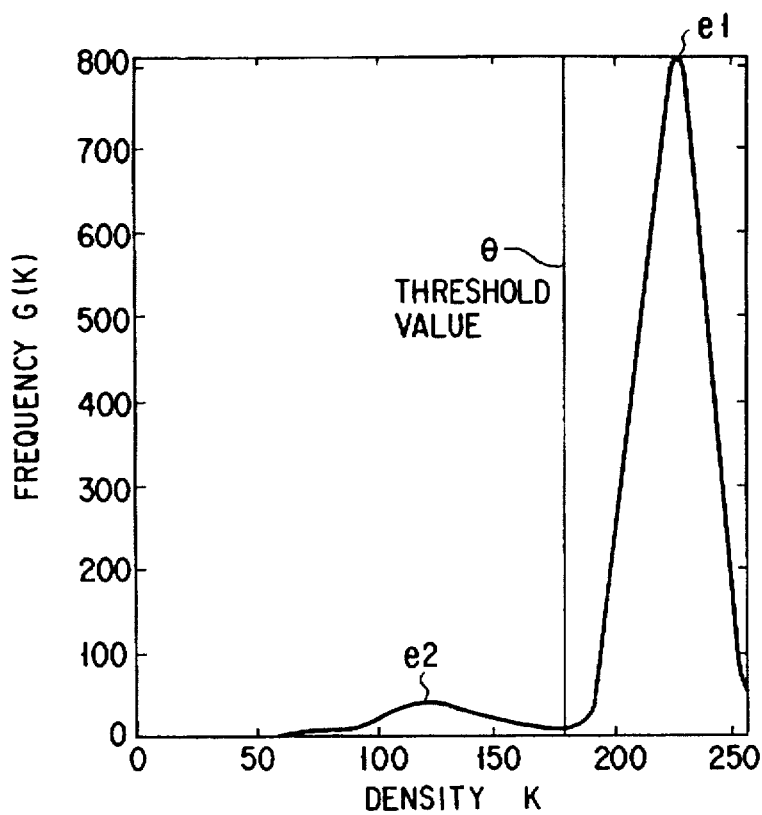
F I G. 9
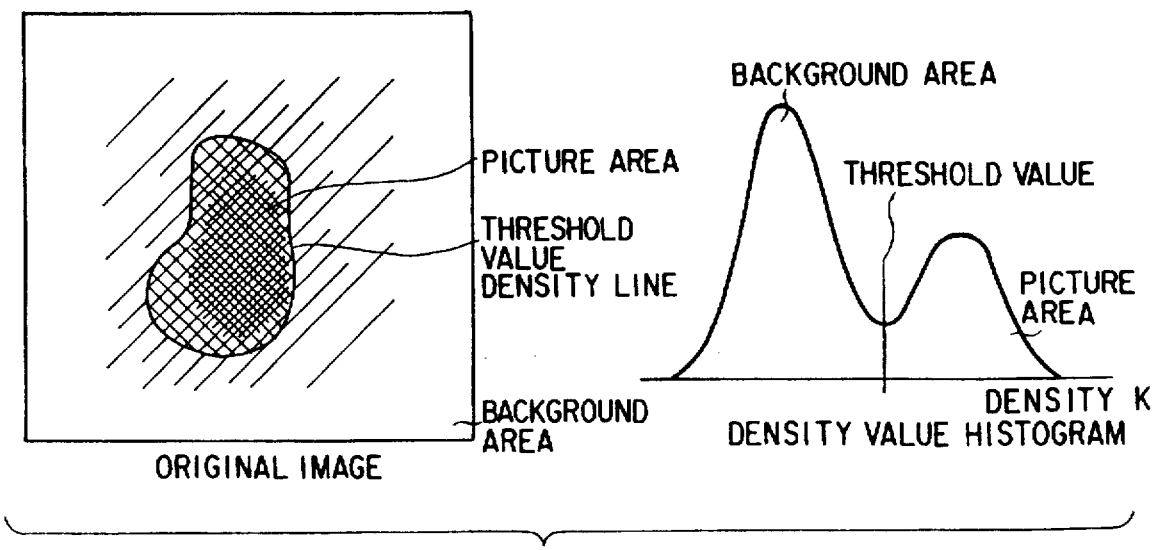
F I G. 10

IMAGE BINARIZATION APPARATUS AND METHOD OF IT

BACKGROUND OF THE INVENTION

1. Field of the Invention

This invention relates to a method of and apparatus for binarizing images by which the density value of each pixel of a light-and-shade image is converted into two separate values (e.g., 1 and 0) on the basis of a suitable threshold value.

2. Description of the Related Art

A binarizing process is the process of converting the density value of each point of a light-and-shade image into two separate values (e.g., 1 and 0), depending on whether the density value is larger or smaller than a suitable reference value.

The binarizing method is needed, for example, for a mail processing apparatus that must process a tremendous amount of mail received every day in a limited time. That is, the binarizing method is needed when the apparatus reads the images on the mail and performs character recognition by sensing from the read images the areas in which address information is written. Namely, the binarizing process has the function of cutting out the target from one of the images on the mail or limiting an object to be cut out from the images on the mail.

Furthermore, a mail processing apparatus that reads the addresses on the mail, and on the basis of the reading results, sorts the mail by delivery zone is required to reliably read the address information on the mail at high speeds. By binarizing the read-out images on the mail as early as possible, the amount of processed images can be reduced and the processing speed made faster.

The study of binarization has been ongoing for a long time. Some of the methods that have been proposed are the P-tile method, the mode method, and the discriminant analysis method. Each of these methods centers on how to determine a threshold value used to binarize an original image.

In the P-tile method, when the percentage of the entire original image taken up by the area of pictures, including characters, is already known, a binarization threshold value is determined on the condition that the features of the portions appearing as the pictures are fulfilled.

In the mode method, when there are two peaks, corresponding to the background area and picture area (including characters), on the original image, in the density value histogram of the original image (as shown in FIG. 10), the density value corresponding to the valley in the histogram is determined to be a binarization threshold value.

In the discriminant analysis method, even when the density histogram of the original image has no clear valley, a density value considered to be a valley is calculated by discriminant analysis in multivariate analysis and determined to be a binarization threshold value.

The P-tile method, mode method, and discriminant analysis method are methods of performing binarization on the basis of the density histogram of the original image.

With any of these binarization methods, the boundary between the character area and the background area can be vague because the density value of the character area varies greatly. This variation is due to, for example, the poorly printed state of the address characters on the mail where the character area is smaller than the background area on the original image. Thus, it is difficult to determine the optimum binarization threshold value because, for example, the peaks of the density value histogram of the character area are small. For this reason, thin horizontal strokes in Minchotai (a Japanese font) may be blurred or a small character covered, preventing correct character recognition.

SUMMARY OF THE INVENTION

The object of the present invention is to provide a method of and apparatus for binarizing light-and-shade images which are capable of determining the optimum binarization threshold value for an original image and performing a highly accurate binarization process at high speeds.

The present invention is classified into an edge binarization method and a noise binarization method, each of which has the following features.

According to the present invention using an edge binarization method, there is provided an apparatus for binarizing images, including a means for computing a difference between densities of adjacent pixels of an original image and comparing the difference with a specific value. A detecting means detects an edge area of the original image on the basis of the comparison result of the computing means. A determining means determines a threshold value on the basis of a density distribution of pixels in the edge area. A binarizing means binarizes the original image on the basis of the threshold value.

With the present invention, for example, the edge area near the outline of characters is first extracted. Furthermore, according to the idea that the optimum threshold value lies in the image densities in the edge area, for example, a differentiating process is performed on the image densities in the edge area and then an integrating process is performed with respect to density. Thus, a major density value in the area is found and the density value which becomes the threshold value is determined.

By such processing, the processing method of the present invention focusing only on the edge area is capable of making a more accurate threshold judgment without being affected by unnecessary density information such as from the background. This accurate judgment may be made even if the boundary between the character area and the background area in the density value histogram is vague as in the poorly printed mails.

According to a noise binarization method of the present invention, there is provided an apparatus for binarizing images, including a means for comparing density values of target pixels composed of n×m pixels (n and m are each an integer of 1 or more) of an original image with density values of a plurality of surrounding pixels in vicinities of the target pixels and outputting a comparison result. A judging means judges on the basis of the comparison result whether or not the target pixels are isolated from the surrounding pixels. A detecting means detects the density values of the target pixels which make the target pixels isolated by binarization process when the judging means has judged that the target pixels are isolated. A calculating means calculates out accumulated isolated pixel frequencies of each density value detected by the detecting means when the judging means and the detecting means have finished each process of all the original image. A determining means determines a threshold value on the basis of the accumulated isolated pixel frequencies calculated by the calculating means. A binarizing means binarizes the original image on the basis of the threshold value.

With this configuration, a pixel having the highest density (or lowest density) among the surrounding pixels adjacent to the target pixel is detected, and the highest density value and the second highest (or lowest) density are counted. Specifically, the density values which would make the target pixel isolated, are counted. Density values between the highest (or lowest) density value and the second highest (or lowest) density value should be detected through all of the original image. However, only the highest density value and the second highest density value are actually detected to simplify the calculation. The same processing is effected on all of the pixels having the highest (or lowest) density value of the original image. After the original image is processed, the calculating means calculates out the accumulated isolated pixel frequencies. The accumulated isolated pixel frequencies give data indicating how frequently each density value produces isolated pixels at the binarization process. Therefore, on the basis of the accumulated isolated pixel frequencies, the determining means determines the density with the minimal frequency as the most appropriate threshold density value. Accordingly, even when the entire density histogram has no distinct features, it is possible to determine a suitable threshold value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4B is a table to help explain a different process of the invention;

FIG. 5 illustrates concrete examples of the shape of noise made up of the target pixel and its adjacent pixels;

FIG. 8 is a flowchart to help explain a concrete processing procedure for the noise binarization method in the binarization circuit of FIG. 1;

FIG. 9 is a diagram concretely showing the density distribution of isolated points caused as a result of performing the noise binarization process on the original image as shown in FIG. 8; and FIG. 10 is drawings to help explain a conventional binarization method.

DETAILED DESCRIPTION OF THE PREFERRED EMBODIMENTS

Hereinafter, referring to the accompanying drawings, an embodiment of the present invention will be explained.

Figure 1:
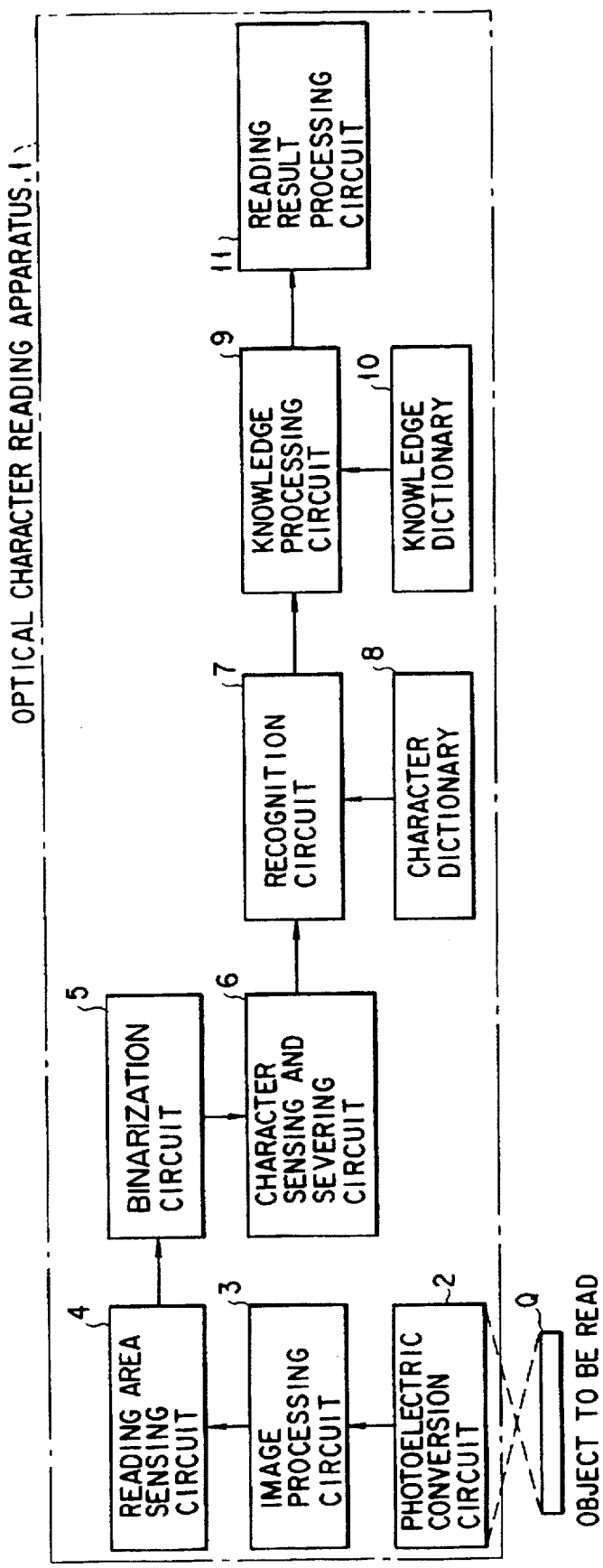
FIG. 1 is a schematic block diagram of an optical character reading apparatus according to an embodiment of the present invention.

FIG. 1 schematically shows the configuration of an optical character reading apparatus 1 to which a binarization method according to an embodiment of the present invention is applied. For example, the optical character reading apparatus 1 (hereinafter, referred to as the character reading apparatus 1) is used as a mail processing apparatus that reads the images on the mail and on the basis of the read images, recognizes the address characters, or as a bill reading apparatus that reads the characters written on bills.

After the image of an object Q to be read has been read optically, it is converted into an electric signal by a photo-electric conversion circuit 2 using, for example, a CCD sensor. The input image converted into an electric signal is processed by an image processing circuit 3, which performs a differentiating process on the input signal. On the basis of the process result, a reading area sensing circuit 4 senses the reading target area, using labeling and projection techniques.

The reading target area is the address entry area if the character reading apparatus 1 is used as a mail processing apparatus, or the information area for customer number or an amount of money if it is used as a bill reading apparatus.

The image in the reading target area is binarized by a binarization circuit (an image binarization unit) 5.

The binarizing process may involve the following: a case where a threshold value is determined for all of the input images, a case where a threshold value is determined for the entire reading area, a case where a threshold value is determined for each character line, and a case where a threshold value is determined for each of smaller areas. When a binarizing threshold value is determined for wide areas, characters are liable to be blurred in one area and to be covered in another area. Conversely, when the area to be binarized is too small, the area may not be binarized properly. Therefore, it is desirable that the area to be binarized should be divided into suitable pieces and the threshold process be performed for these divided pieces.

The image binarized at the binarization circuit 5 is separated by a character sensing and severing circuit 6 into characters according to the labeling and projection information. The character sensing and severing circuit also integrates separated characters into one character or severs a contact character into separate characters. The characters which are separated are collated with character patterns in a character dictionary 8 at a recognition circuit 7, which obtains character candidates by classifying the separated characters into several categories most similar to them.

A knowledge processing circuit 9 collates words with a knowledge dictionary 10 and constructs address information, for example. The knowledge dictionary 10 is a dictionary for word collation with the object Q to be read. For example, when the character reading apparatus 1 is used as a mail processing apparatus, address information is stored in the knowledge dictionary.

The reading result of the knowledge processing circuit 9 is sent to a reading result processing circuit 11. For example, if the character reading apparatus 1 is used as a mail processing apparatus, the reading result processing circuit performs the process of transporting the mails to the delivery zone slots provided by address. If the character reading apparatus 1 is used as a bill reading apparatus, the reading result processing circuit performs the process of displaying the reading result on a display or the like, and storing it in files.

The binarization method of the present invention is applied to the binarization circuit 5 of FIG. 1. Hereinafter, the binarization method will be explained.

In the following explanation, it is assumed that each pixel of images is darker, the smaller its density value is, and that each pixel of images is lighter, the larger its density value is.

First, a first binarization method will be explained. Hereinafter, the first binarization method is referred to as a binarization threshold determining method using the density distribution in the edge area or an edge binarization method.

In the edge binarization method, when the difference between the density values of two adjacent pixels has exceeded a threshold value in the input image, the pixels are determined to be an edge forming the boundary between two areas differing in light and shade. The same is done for all of the remaining pixels to extract the edge area. Then, the density distribution in the extracted edge area is obtained so as to interpolate between the density values of two pixels the difference of which has been computed in obtaining the edge. The density value that almost maximizes the value of the density distribution is determined to be a binarization threshold. Namely, the edge binarization method is a binarization method based on the assumption that the optimum binarization threshold lies in the density values within the edge.

The edge binarization method will be explained in further detail by reference to FIG. 2.

Figure 2:
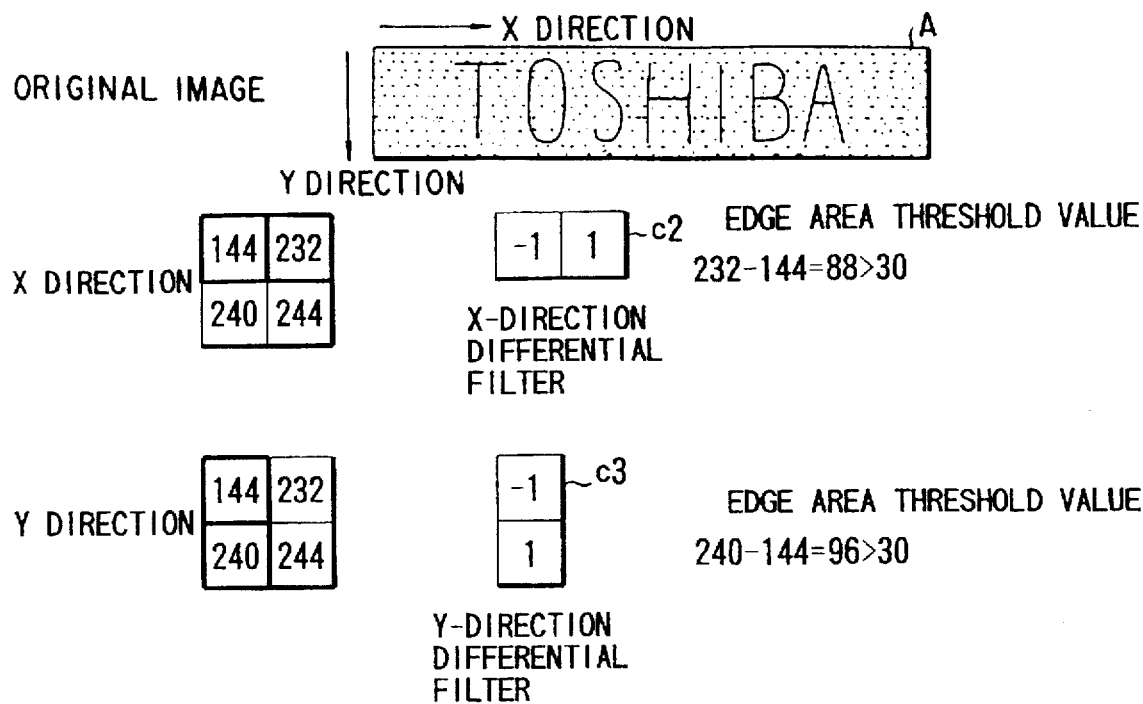
FIG. 2 is drawings to help explain an edge binarization method.

In FIG. 2, it is assumed that in the original image A, where light and shade is less clear throughout the image, the density of the entire image is high (the average density value is low), and the boundary between the character area and the background area is vague. In FIG. 2, the density value of a target pixel is 144, the density value of the pixel on the right of the target pixel is 232, and the density value of the pixel under the target pixel is 240. When the difference between the pixel on the right and the target pixel is computed using an x-direction differential filter C2, with pixels on the left of the target pixel in the x direction being negative and those on the right of the target pixel in the x direction being positive, this gives:

$$232-144=88 \quad (1).$$

If the edge area threshold value is 30, the pixel will be determined to be in the edge area because the difference of 88 obtained using equation (1) has exceeded the edge threshold value.

The same operation is performed for the y direction of the original image A. That is, when the difference between the pixel under the target pixel and the target pixel is obtained using a y-direction differential filter C3, with pixels over the target pixel in the y direction being negative and pixels under the target pixel in the y direction being positive, this gives:

$$240-144=96 \quad (2).$$

The difference of 96 found using equation (2) is larger than the edge area threshold value, so that the pixel is determined to be in the edge area.

As the target pixel is moved pixel by pixel, starting from, for example, the top left of the original image A, the operation is performed repeatedly for all of the pixels (specifically, all of the pixels excluding the rightmost line and the bottom line), thereby extracting the edge area.

The edge area threshold value is a suitable density value that can be the boundary between the picture area including characters and the background area on the original image A and is determined beforehand according to the state of the density distribution of the original image A.

Next, the density distribution in the extracted edge area is found. Namely, to determine a binarization threshold value between the density values of two pixels the difference of which has been computed to obtain the edge, the density distribution is obtained so as to interpolate between the density values of the two pixels.

At this time, on the basis of the large and small relationship between two adjacent pixels in the edge area, a differentiating process is performed to find a differential value that indicates the degree to which a binarization threshold value used in binarizing the original image A exists between the density values of the two adjacent pixels. The process is performed for each density value in the density distribution of pixels in the edge area (the accumulation of values each representing the large and small relationship of adjacent densities as 1 or −1). Thereafter, these differential values are integrated with respect to density over all of the density values in the edge area (the differential values are accumulated, starting from lower to higher densities) to obtain the density distribution in the edge area.

Figure 3A:
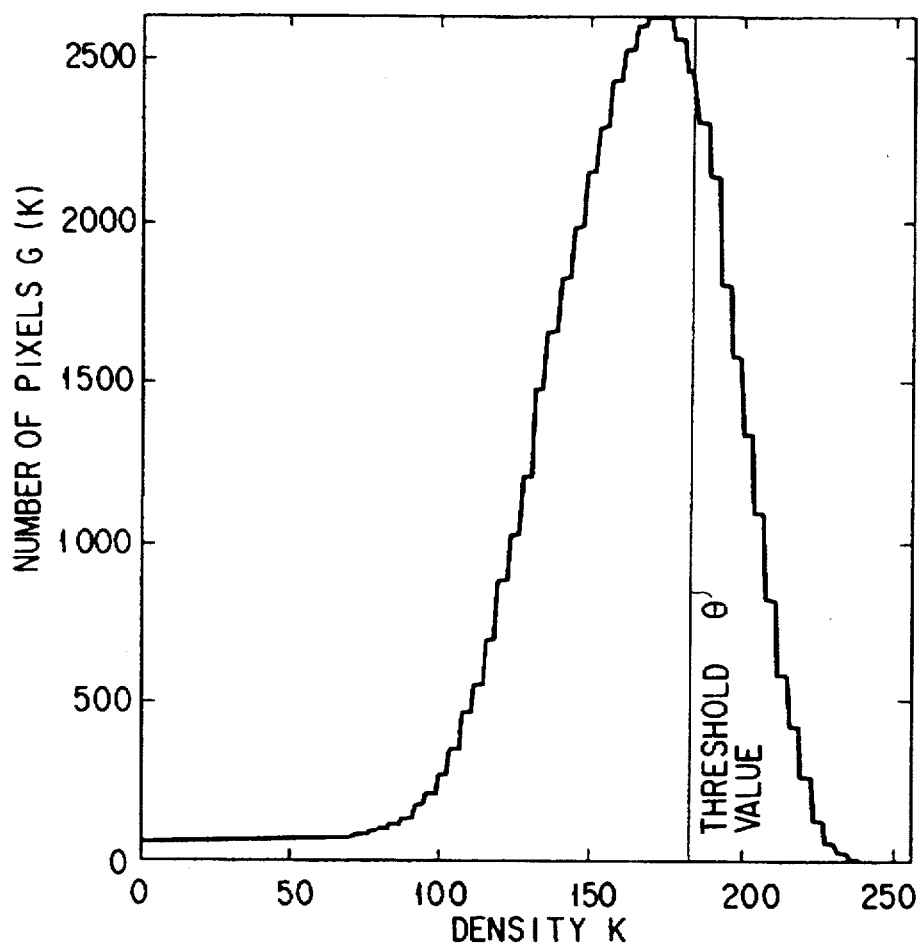
FIG. 3A shows a concrete example of the density distribution of the pixels in the edge area extracted from an original image.

As a result, as shown in FIG. 3A, a histogram (the density distribution in the edge area) of the density values of the pixels in the edge area extracted from the original image A is obtained. In the density distribution, the density value at which the distribution value is almost the largest is determined to be a binarization threshold value of 01.

The method of finding the differential values for a density distribution (the accumulation of the values each representing the large and small relationship between adjacent densities as 1 or −1) and then obtaining a density distribution has the effect of reducing the number of steps of calculation, and thereby speeding up the processing.

It goes without saying that a threshold value may be determined by another method, for instance, by a method of simply obtaining the peak of density in the edge area.

Figure 4A:
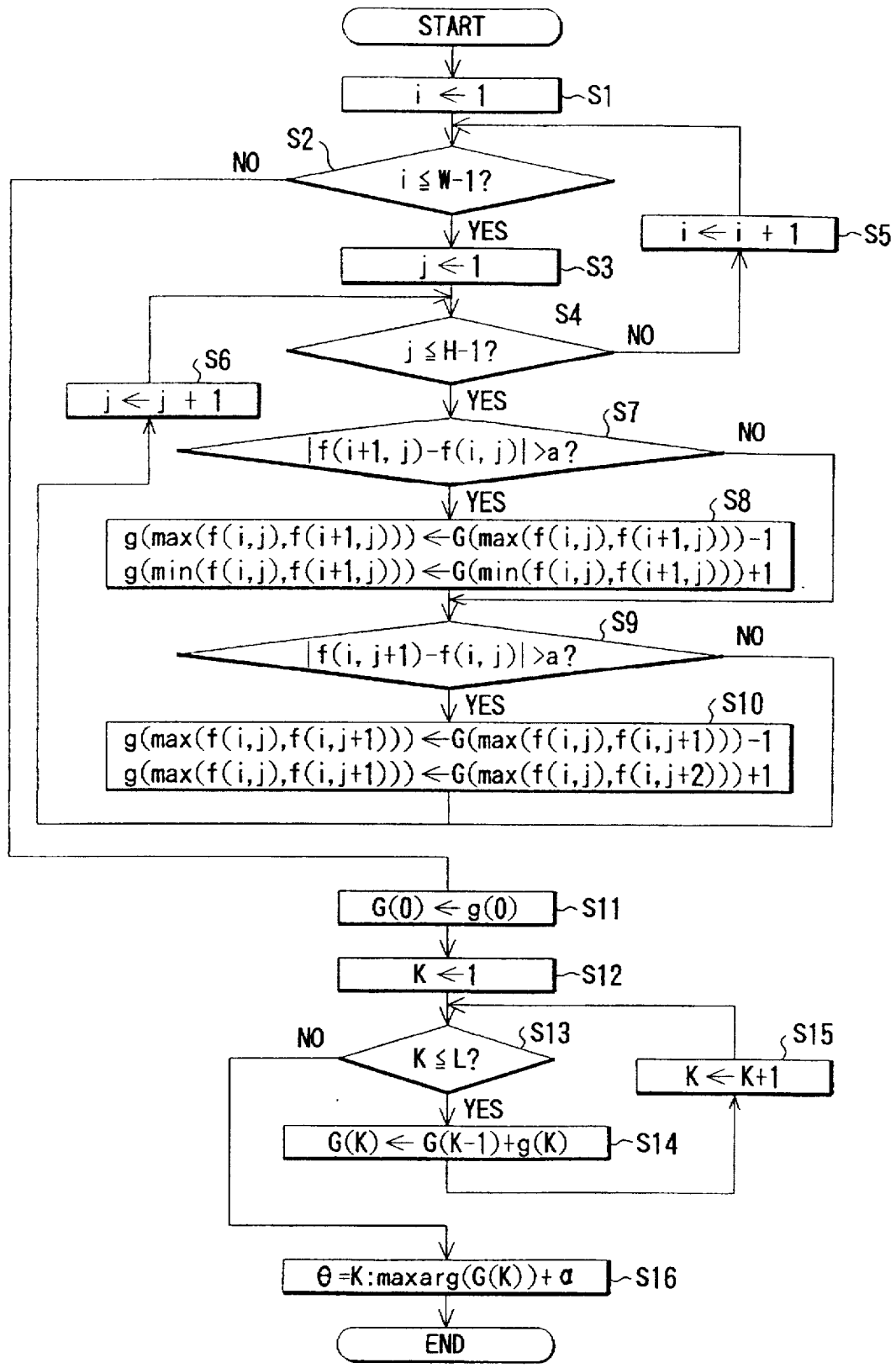
FIG. 4A is a flowchart to help explain a concrete processing procedure for the edge binarization method in the binarization circuit of FIG. 1.

Referring to FIGS. 4A and 4B, a concrete processing procedure for the edge binarization method in the binarization circuit 5 of FIG. 1 will be explained.

The breadth of the inputted light-and-shade image (original image A) is determined to be W and its length to be H. At step S1 to step S10, the target value is shifted one by one for each pixel value, starting from, for example, the top left. Then, the edge area is extracted and the density distribution in the extracted edge area is differentiated (the values each representing the large and small relationship between adjacent densities as 1 or −1 are accumulated as shown in FIG. 4B).

A variable in the x direction is determined to be i and a variable in the y direction is determined to be j. Each pixel is represented as (i, j).

At step S1 to step S6, the target pixel (i, j) is set in sequence and all of the pixels from (0, 0) to (W−2, H−2) excluding the rightmost line and the bottom line are checked so that the processes at step S7 and later may be performed.

In the subsequent steps, the target pixel (i, j) set at step S1 to step S4, pixel (i+1, j) adjacent to the target pixel in the x direction, and pixel (i, j+1) adjacent to the target pixel in the y direction are pixels to be processed.

At step S7, as described above, the difference between these pixels and the target pixel is determined using the x-direction differential filter C2, with pixels on the left of the target pixel in the x direction being negative and a pixel on the right of the target pixel in the x direction being positive. Then, the difference is compared with an edge area threshold a (e.g., 30).

Specifically, it is assumed that the density value of the target pixel is f(i, j) and the density of the pixel on the left of the target pixel is f(i+1, j). When the difference |f(i+1, j)−f(i, j)| is larger than the edge area threshold a, the pixel will be judged to be in the edge area and control will proceed to step S10. When the difference is smaller than the edge area threshold a, the pixel will be judged to be outside the edge area and control will skip step S10 and advance to step S9.

At step S8, the differential value of each density value in the density distribution of the pixels in the edge area (the accumulation of the values each representing the large and small relationship between adjacent densities as 1 or −1 as shown in FIG. 4B) is found on the basis of the large and small relationship between two adjacent pixels in the x direction.

First, if the differential value (the accumulation of the values each representing the large and small relationship between adjacent densities as 1 or −1) at a density value of K of a pixel in the edge area as shown in FIG. 4B is g(K), g(K) will be determined as follows. The density values of two pixels are compared with each other. The frequency "1" is added to the differential value at the minimum density value (the smaller density value).

If the minimum one of the density values f(i, j) and f(i+1, j) of two pixels is represented as min(f(i,j), f(i+1,j)), because the frequency "1" is added to the differential value at the minimum density value, g(min(f(i,j), f(i+1, j)))+1 will be substituted into g(min(f(i, j), f(i+1, j))).

On the other hand, the density values of two pixels are compared with each other. The frequency "1" is subtracted from the differential value at the maximum density value (the larger density value).

If the maximum one of the density values f(i, j) and f(i+1, j) of two pixels is represented as max(f(i,j), f(i+1,j)), because the frequency "1" is subtracted from the differential value at the maximum density value, g(max(f(i,j), f(i+1, j)))−1 will be substituted into g(max(f(i, j), f(i+1, j))).

Specifically, in the case of the target pixel with a density value of 144 and the adjacent pixel with a density value of 232 as shown in FIG. 2, because the frequency "1" is added to the differential value g(144) at the minimum density value, g(144)+1 will be substituted. Furthermore, because the frequency "1" is subtracted from the differential value g(232) at the maximum density value, g(232)−1 will be substituted.

Then, control proceeds to step S9, where as described above, the difference between these pixels and the target pixel is determined using the y-direction differential filter C3 with pixels over the target pixel in the y direction being negative and pixels under the target pixel in the y direction being positive. Then, the difference is compared with the edge area threshold a (e.g., 30).

Specifically, it is assumed that the density value of the target pixel is f(i, j) and the density of the pixel under the target pixel is f(i, j+1). When the difference f(i, j+1)−f(i, j) is larger than the edge area threshold a, the pixel will be judged to be in the edge area and control will proceed to step S9. When the difference is smaller than the edge area threshold a, the pixel will be judged to be outside the edge area and control will be returned to step S1 to step S4.

At step S10, the differential value of each density value in the density distribution of the pixels in the edge area (the accumulation of the values each representing the large and small relationship between adjacent densities as 1 or −1 as shown in FIG. 4B) is found on the basis of the large and small relationship between two adjacent pixels in the y direction as in the process at step S8.

Specifically, in the case of the target pixel with a density value of 144 and the adjacent pixel with a density value of 240 as shown in FIG. 2, because the frequency "1" is added to the differential value (the accumulation of the values each representing the large and small relationship between adjacent densities as 1 or −1) of g(144) at the minimum density value, g(144)+1 will be substituted. Furthermore, because the frequency "1" is subtracted from the differential value of g(240) at the maximum density value, g(240)−1 will be substituted.

The processes at step S1 to step S10 are performed on all of the pixels excluding the right most line and bottom line of the original image A.

Next, at step S11 to step S14, the differential values g(K) of the density distribution in the edge area obtained through step S10 are integrated for all of the density values in the edge area to find the density distribution G(K) in the edge area.

First, at step S11, the initial value of the density distribution G(K) in the edge area is determined. That is, the value of G(0) for the density value K=0 is determined to be g(0).

At step S12 to step S15, as the density value K is incremented by 1, the differential value g(K) is accumulated and integrated for all of the density values (K=0 to L where L=255) in the edge area, thereby determining the density distribution G(K).

Specifically, the density distribution G(K) is computed using the following equations:

$$G(0)=g(0)$$

$$G(1)=G(0)+g(1)$$

$$G(2)=G(1)+g(2)$$

$$G(k)=G(K-1)+g(K)$$

$$G(255)=G(254)+g(255)$$

As a result of integrating the differential values for all of the density values in the edge area and obtaining the density distribution in the edge area, a histogram of density values in the edge area (the density distribution in the edge area), as shown, for example, in FIG. 3A is obtained.

From the density distribution in the edge area of FIG. 3A, it can be seen that the peak of the frequency distribution is near a density value of 160. The value obtained by adding an offset amount of α to the top of the peak, that is, the density value k:maxarg (G(K)) at which the density distribution in the edge area becomes the largest, is determined to be a binarization threshold of θ (step S16). Here, k:maxarg() represents K that maximizes the equation in the parentheses. When α=0, there is no offset amount.

It is clear empirically that determining the value shifted a certain mount (an offset amount) from the maximum point in the density distribution to be a binarization threshold enables a more accurate binarization process than determining the maximum density value in the density distribution to be a binarization threshold.

Figure 3B:
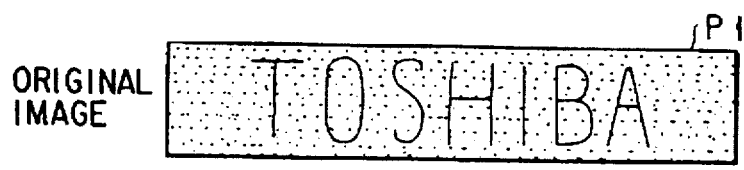
FIG. 3B shows a binary image obtained by the edge binarization method of the present invention.
Figure 3B:

As described above, when the difference between the density values of two adjacent pixels in the original image A, as shown for example in FIG. 3A, has exceeded a threshold value, the edge area is extracted using the pixels as an edge. Then, the density distribution in the extracted edge area is obtained so as to interpolate between the density values of the two pixels the difference between which has been determined in obtaining the edge. A density value at which the value of the density distribution is almost the largest is determined to be a binarization threshold. This makes it possible to determine the optimum binarization threshold θ, even if as with the original image A of FIG. 3B, light and shade is less clear throughout the image and the boundary between the character area and the background area is vague. As a result, the binarization process of the original image A can be performed accurately (see the binarized image P2 in FIG. 3B).

Furthermore, in order to determine a binarization threshold between the density values of the two pixels the difference between which has been found in obtaining the edge, the differentiating process of determining the differential value (the accumulation of the values each representing the large and small relationship between adjacent densities as 1 or −1 as shown in FIG. 4B) for each density value in the density distribution of the pixels in the edge area is first performed. The differential value indicates the degree to which a binarization threshold value used in binarizing the original image A exists between the density values of the two adjacent pixels in the edge area. Thereafter, the differential values are integrated for all of the density values in the edge area and the density distribution in the edge area is obtained. This enables the binarization process to be carried out at high speeds.

Furthermore, in the case of an image processing apparatus provided with a differential filter, because the filter can be used, the binarization circuit 5 can be made smaller in size.

Now, a second binarization method applied to the binarization circuit 5 of FIG. 1 will be explained. The second binarization method is referred to as the noise minimizing binarization threshold value determining method or the noise binarization method.

With the noise binarization method, when an original image is binarized using an arbitrary density value as a threshold value, the optimum binarization threshold value is obtained on the basis of the features of the density distribution of isolated points sensed from the shape formed by each pixel and vicinal pixels. Here, a shape formed by the target pixel and vicinal pixels is referred to as noise.

FIG. 5 illustrates concrete examples of the shape of noise composed of the target pixel and its vicinal pixels.

In FIG. 5, only the target pixel in the noise shape H1 is black and its eight vicinal pixels are white. The target pixel is considered to be an isolated point caused by the blurring of characters or isolated noise in the background. The noise shape H2 shows isolated points obtained by reversing the noise shape H1 in black and white.

The noise shape H3 is a noise produced by a similar cause or fine irregularities in the edge portion. The noise shape H4 is the black-and-white reverse of the noise shape H3.

The noise shape H5 is noise caused by irregularities in the edge portion and is considered to appear more frequently when a clear outline cannot be drawn. The noise shape H6 is the black-and-white reverse of the noise shape H5.

The noise shape H7 is also caused in the same manner as the noise shape H5. The noise shape H8 is the black-and-white reverse of the noise shape H7.

Any shape has the property that the number of its pixels decreases when the binarization threshold is appropriate and increases when the binarization threshold is inappropriate. The present invention uses such a property in determining a binarization threshold.

Here, the isolated points in the noise shapes H1 and H2 of FIG. 5 are defined as noise. Hereinafter, noise and isolated points are regarded as having the same meaning.

Figure 6:
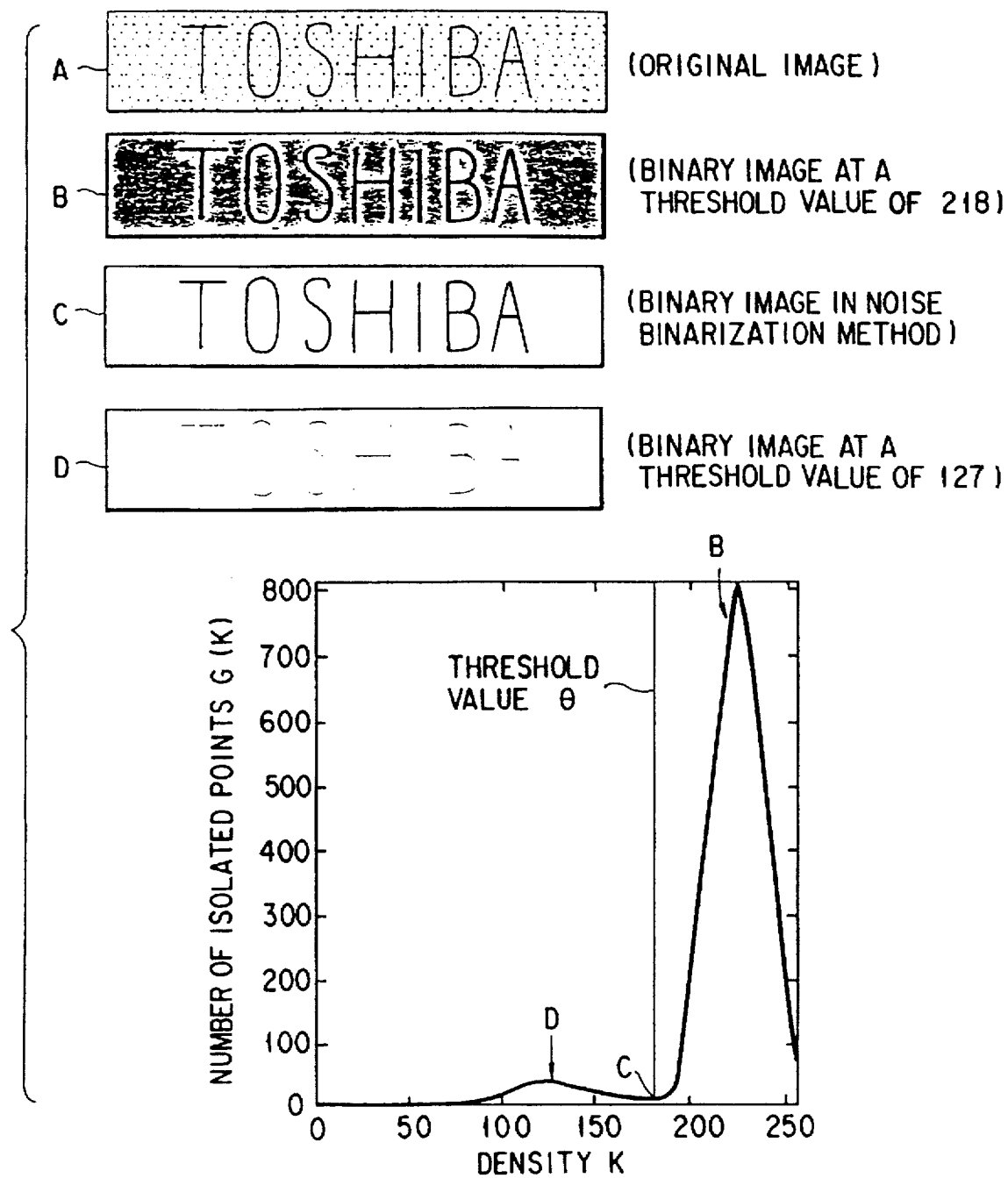
FIG. 6 is drawings to help explain the principle of a noise binarization method.

FIG. 6 includes drawings A to D to help explain the principle of the noise binarization method, and a diagram showing the relationship between the density and isolated points. The binary images B to D are obtained by finding the amount of noise in the entire image with an arbitrary threshold value for the original image A where light and shade is less clear throughout the image, the density of the entire image is high (the average density value is low), and the boundary between the character area and the background area is vague. The results are plotted to form binary images B to D.

When the original image A is binarized using a relatively large density value (e.g., a density value of 218) as the binarization threshold, the characters are covered as shown by the binarized image B, making the background noise conspicuous. Consequently, the amount of noise increases.

When the original image A is binarized using a relatively small density value (e.g., a density value of 127) as the binarization threshold, the characters are blurred, making part of the stroke isolated points. Consequently, the amount of noise increases.

In the diagram of FIG. 6, if the valley between two mountains where the number of isolated points peaks is determined to be the optimum binarization threshold θ, the optimum binary image C, from which the most possible noise is removed can be obtained.

Figure 7:
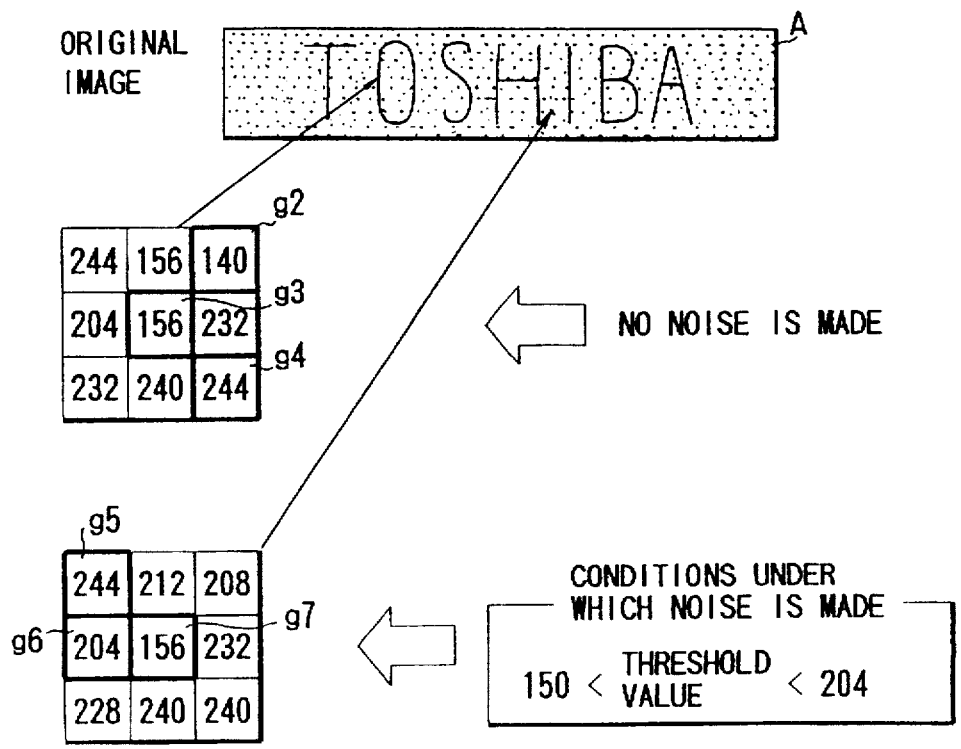
FIG. 7 is drawings to help explain the noise binarization method in further detail.

Referring to FIG. 7, the noise binarization method will be explained in further detail.

The conditions under which noise takes the noise shape H1 of FIG. 5 are that the density value of the target pixel is smaller than the minimum density value of its eight vicinal pixels, and the binarization threshold lies between the density value of the target pixel and the minimum density value of the eight vicinal pixels. The conditions under which noise takes the noise shape H2 of FIG. 5 are that the density value of the target pixel is larger than the maximum density value of its eight vicinal pixels, and the binarization threshold lies between the density value of the target pixel and the maximum density value of the eight vicinal pixels.

The eight vicinal pixels to the target pixel G3 of the original image A in FIG. 7 will be considered. The density value of the target pixel G3 is 144. Of the density values of the eight vicinal pixels to the target pixel, the largest one is 244, which is the density value of pixel G4 at the bottom right, and the smallest one is 140, which is the density value of pixel G2 at the top right.

In this case, since neither the conditions for noise shape H1 nor the conditions for noise shape H2 are fulfilled, the target pixel is not an isolated point.

On the other hand, the eight vicinal pixels to the target pixel G7 will be considered. The density value of the target pixel G7 is 156. Of the density values of the eight vicinal pixels to the target pixel, the largest one is 244, which is the density value of pixel G5 at the top left, and the smallest one is 204, which is the density value of pixel G6 on the left side.

In this case, when the binarization threshold is larger than 156 and smaller than 204, noise will take the form of noise shape H1.

As described above, with the noise binarization method, the target pixel is first compared with the largest and smallest ones of the density values of its eight vicinal pixels. When both of the conditions for noise shape H1 and noise shape H2 are fulfilled, the target pixel is sensed as an isolated point. Specifically, the target pixel is sensed as an isolated point that is formed in binarizing the original image A using as a threshold value a density value lying between the density value of the target pixel and the largest or smallest one of the density values of the eight vicinal pixels. Then, from the density distribution of the sensed isolated points, the density value at which the number of isolated points is the smallest is determined to be a binarization threshold.

To obtain the density distribution (noise distribution) of isolated points, the differential value for each density value in the density distribution of isolated points (the accumulation of the values each representing the large and small relationship between the target pixel density of an isolated point and the maximum (or minimum) density value of the vicinal pixels as 1 or −1 as shown in FIG. 4B) is found in a similar manner to the aforementioned edge binarization method. The differential values are then integrated over all of the density values to obtain a noise distribution.

Specifically, the target pixel is compared with the density values of its eight vicinal pixels in the original image A. When both of the conditions for noise shape H1 and noise shape H2 are fulfilled, the target pixel is sensed as an isolated point. The density distribution of the isolated points indicates the degree to which a threshold used in binarizing the original image A exists between the density value of the target pixel sensed as an isolated point and the largest or smallest one of the density values of the eight vicinal pixels. Therefore, the differential value for each density value in the density distribution of the isolated points is found and all of the differential values (see FIG. 4B) are integrated over all of the density values.

By finding the differential values of the noise distribution and obtaining a density distribution, the number of computing steps is reduced and the processing speed is made faster, as in the edge binarization method.

Another method is to simply find a density value showing the peak in the density distribution of isolated points and determine θ on the basis of the density value.

Referring to FIG. 8, a concrete processing procedure for the noise binarization method in the binarization circuit 5 of FIG. 1 will be explained.

At step S21 to step S31, for example, as the target pixel is shifted sequentially from the top left for all of the pixels excluding the outermost pixels of the original image A, isolated points are sensed on the basis of the target pixel and its eight vicinal pixels. The differential of the density distribution of the sensed isolated points is found.

A coordinate variable in the x direction is determined to be i and a coordinate variable in the y direction is determined to be j. Each pixel is represented as (i, j). The density value of the target pixel (i, j) is determined to be f(i, j).

At step S21 to step S26, the target pixel (i, j) is set in sequence and all of the pixels from (1, 1) to (W−2, H−2) excluding the outermost pixels are checked so that the processes at step S22 and later may be performed.

In the subsequent processes, the target pixel (i, j) set at step S21 to step S26 and its eight vicinal pixels "8" are pixels to be processed. Here, "8" indicates eight pixels over and under, on the right and left sides of, at the top right and left of, and at the bottom right and left of the target pixel.

At step S27, the largest one MAX8 and smallest one MIN8 of the density values of the eight vicinal pixels "8" to the target pixel (i, j) are found.

At step S28, the largest one of the density values of the eight vicinal pixels is compared with the density value of the target pixel to check for the conditions under which noise takes noise shape H2. Specifically, when the density value f(i, j) of the target value is larger than the largest one MAX8 of the density values of the eight vicinal pixels, noise sensing will be effected and control will proceed to step S29.

On the other hand, when a noise having noise shape H2 has not been sensed, control will go to step S30, where a check will be made for the conditions under which noise takes noise shape H1.

At step S29, the degree of a change in the density distribution of noises sensed at step S28 is determined. That is, the differential value of the distribution frequency for each density value (the accumulation of the values each representing the large and small relationship between the target pixel density of an isolated point and the maximum (or minimum) density value of the vicinal pixels as 1 or −1 as shown in FIG. 4B) is determined.

As with the edge binarization method, with the noise binarization method, if the differential value at the density value K of the sensed noise is expressed by g(K), g(K) will be found as follows. When the density value f(i, j) of the target pixel (i, j) is larger than the largest one MAX8 of the density values of the eight vicinal pixels, the frequency "1" will be subtracted from g(K)=g(f(i, j)) at the density value f(i, j), whereas the frequency "1" will be added to the differential value g(K)=g(MAX8) at the largest density value MAX8.

Then, control advances to step S30, where the smallest one of the density values of the eight vicinal pixels to the target pixel is compared with the density value of the target pixel to check for the conditions under which noise takes noise shape H1. Specifically, when the density value f(i, j) of the target value is smaller than the smallest one MIN8 of the density values of the eight vicinal pixels, noise sensing will be effected and control will proceed to step S31.

On the other hand, when a noise having noise shape H1 has not been sensed, control will go to step S22 and step S24, where coordinate variables i and j will be updated.

At step S31, as described above, the degree of a change in the density distribution of noises sensed at step S30, that is, the differential value of the distribution degree for each density value is determined.

Specifically, when the density value f(i, j) of the target pixel (i, j) is smaller than the smallest one MIN8 of the density values of the eight vicinal pixels, the frequency "1" will be added to g(K)=g(f(i, j)) at the density value f(i, j), whereas the frequency "1" will be subtracted from the differential value g(K)=g(MIN8) at the smallest density value MAX8.

Specifically, when the target pixel G7 having a density value of 156 has been sensed as noise as explained in FIG. 7, the frequency "1" is added to the differential value g(156) of the noise distribution at a density value of 156, whereas the frequency "1" is subtracted from the differential value g(204) of the noise distribution at the smallest value of 204 of the eight vicinal pixels.

The processes from step S21 to step S31 are performed on all of the pixels excluding the outermost pixels of the original image, as with the edge binarization method (see FIG. 4B).

Then, at step S32 to step S36, the differential values g(K) of the density distribution of the noises obtained up to step S31 are integrated for all of the density values (e.g., the density values ranging from 0 to 255) to obtain the density distribution G(K) of the noises.

The processes at step S32 to step S35 are the same as those at step S12 to step S15 of FIG. 4.

At step S36, the noise distribution obtained by integrating the differential values g(K) of the density distribution of noises for all of the density values is subjected to, for example, the smoothing process of removing small irregularities in the noise distribution by weighting the average of the number of vicinal noises.

As a result of performing the processes up to step S36 on the original image A, a noise distribution, as shown for example in FIG. 9, is obtained.

In the density distribution of isolated points (noises) shown in FIG. 9, the distribution of the number of isolated points sensed as noise shapes H1 and H2 has two peak points (mountains), e1 and e2. As shown in the figure, e1 is the peak of the maximum value and e2 is the peak of the minimum value.

Then, control advances to step S37, where the maximum value of the noise distribution is found in, for example, the noise distribution shown in FIG. 9, and determined to be the first mountain e1. The second largest peak next to the peak of mountain e1 is sensed as mountain e2. The density value of the valley portion between the two mountains e1 and e2 is determined to be a binarization threshold θ in the noise binarization method. In this case, in order not to select a smaller mountain by mistake, it is necessary to remove small valleys between the two mountains e1 and e2.

While the image processing at step S27 to step S31 is effected pixel by pixel for the target pixel, it may be effected on an n×m pixels basis. This makes it possible to sense an isolated area consisting of several pixels.

Although in the embodiment, only noise shapes H1 and H2 of FIG. 5 have been explained, the same is almost true for noise shapes H3 to H8 of FIG. 5 except for the conditions under which noise is sensed.

The conditions under which noise shape H3 is sensed are that, for example, the smallest one of the density value of the target pixel and the density value of the pixel directly under the target pixel is smaller than the smallest one of the density values of the remaining vicinal pixels.

The conditions under which noise shape H4 is sensed are that, for example, the largest one of the density value of the target pixel and the density value of the pixel directly under the target pixel is larger than the largest one of the density values of the remaining vicinal pixels.

In the case of noise shapes H5 to H8, too, the largest or smallest one of the density values of a plurality of pixels including the target pixel is compared with the largest or smallest one of the density values of the remaining vicinal pixels as shown in FIG. 5 and these noise shapes can be sensed on the basis of the result of the comparison.

In this way, for example, when noise shapes H4, H6, and H8 have been sensed, at step S29 of FIG. 8, the frequency "1" is subtracted from the differential value of the noise distribution for the largest one of the density values of pixels including the target pixel, whereas the frequency "1" is added to the differential value of the noise distribution for the largest one of the density values of the remaining vicinal pixels. Furthermore, when noise shapes H3, H5, and H7 have been sensed, at step S31 of FIG. 8, the frequency "1" is added to the differential value of the noise distribution for the smallest one of the density values of pixels including the target pixel, whereas the frequency "1" is subtracted from the differential value of the noise distribution for the smallest one of the density values of the remaining vicinal pixels. The processes that follow are the same as those explained in FIG. 9.

As described above, with the noise sensing method, noises that meet the conditions for noise shapes H1 and H2 of FIG. 5 are sensed for an original image A as shown in FIG. 6, for example, and the density distribution (noise distribution) of noises as shown in FIG. 8 is obtained. Then, a first mountain e1 where the distribution frequency is the largest and a second mountain e2 having the second largest peak next to the distribution frequency of the mountain e1 are sensed. The density value of the valley portion (a minimal value) between the two mountains e1 and e2 is determined to be a binarization threshold of θ. This makes it possible to determine the optimum binarization threshold of θ even if light and shade are less clear throughout the image and the boundary between the character area and the background area is vague as with the original image A shown in FIG. 6. Therefore, by performing the binarization process on the original image A accurately, a clear binarized image (see the binarized image C of FIG. 6) is produced.

Furthermore, since the noise binarization method carries out binarization, taking into account the fact that noise increases when characters blur or when characters are covered because of conspicuous background noise, the method is suitable for binarization of printing type such as Minchotai (a Japanese font) having fine strokes.

As described above, with the present embodiment, when the binarization process is performed on an original image, the optimum binarization threshold value can be determined on the basis of the features of the density distribution in the edge area sensed from the original image or the features of the density distribution of isolated points obtained in binarizing the original image using an arbitrary threshold value. This enables a highly accurate binarization process to be carried out at high speeds.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for binarizing images, comprising:

means for computing a difference between density values of adjacent pixels of an original multi-value image and comparing the difference with a predetermined value;

means for detecting an edge area of the original image on the basis of the comparison result of the computing means, wherein the edge area is a border area of a black pixel and a white pixel;

density distribution calculating means for respectively calculating existent frequencies of each of the density values of pixels in the edge area detected by the detecting means;

means for determining a threshold value on the basis of one of the density values having a maximum existent frequency from the existent frequencies calculated by the density distribution calculating means; and means for binarizing the original image on the basis of the threshold value.

2. An apparatus according to claim 1, wherein the comparing means includes:

an X-direction differential filter for comparing pixels adjacent to each other in the horizontal direction of a target pixel to compute the difference between them; and a Y-direction differential filter for comparing pixels adjacent to each other in the vertical direction of the target pixel to compute the difference between them.

3. An apparatus according to claim 1, wherein the threshold determining means includes:

means for performing a differentiating process on each density value in the edge area for each pixels, the differentiating process counts "+1" on a lower density adjacent pixel, and counts "−1" on a higher density adjacent pixel; and means for performing an integrating process on the result of the differentiating process so as to determine the density distribution.

4. An apparatus according to claim 1, wherein the threshold determining means includes:

processing means for performing a frequency adding process on lower density values and a frequency subtracting process on higher density values in comparing the density values in the edge area; and means for performing an accumulating process on the results of the processing means for each density value.

5. An apparatus according to claim 1, wherein the threshold determining means includes means for determining a density value having the maximum frequency plus a constant value as the threshold value.

6. An apparatus for binarizing images, comprising:

means for comparing density values of target pixels composed of n×m pixels (n and m are each an integer of 1 or more) of an original multi-value image with density values of a plurality of surrounding pixels in vicinities of the target pixels and outputting a comparison result;

means for judging on the basis of the comparison result whether or not the target pixels are isolated from the surrounding pixels when the target pixels are binarized in a binarization process using a predetermined threshold value;

means for detecting the density values of the target pixels which make the target pixels isolated by the binarization process, when the judging means has judged that the target pixels are isolated;

means for calculating accumulated isolated pixel frequencies of each and every density value detected by the detecting means when the judging means and the detecting means have finished each process for all of the original image;

means for determining a threshold value on the basis of one of the density values having a minimum frequency from the accumulated isolated pixel frequencies calculated by the calculating means; and means for binarizing the original image on the basis of the threshold value determined by the determining means.

7. An apparatus according to claim 6, wherein the judging means includes:

means for judging that the density value of the target pixels is the largest of the density values of the surrounding pixels; and means for judging that the density value of the target pixels is the smallest of the density value of the surrounding pixels.

8. An apparatus according to claim 6, wherein the threshold determining means includes:

means for performing a differentiating process on each density value of the target pixels which are isolated by the binarization process, when the judging means has judged that the target pixels are isolated; and means for performing an integrating process on a result of the differentiating process with respect to density.

9. An apparatus according to claim 8, wherein the threshold determining means includes means for determining a minimal value of the results of the integrating process as the threshold value.

10. An apparatus according to claim 6, wherein the threshold determining means includes first means for performing a frequency adding process on lower density values and a frequency subtracting process on higher density values, when the judging means has judged that the target pixels are isolated; and second means for performing an integrating process on a result of the processes of the first means.

11. A method of binarizing images, comprising:

a step of computing a difference between density values of adjacent pixels of an original multi-value image and comparing the difference with a predetermined value;

a step of detecting an edge area of the original image on the basis of the comparison result of the computing step, wherein the edge area is a border of a black pixel and a white pixel;

a density distribution calculation step of respectively calculating existent frequencies of each of the density values of pixels in the edge area detected by the detecting step;

a step of determining a threshold value on the basis of one of the density values having a maximum existent frequency from the existent frequencies calculated in the density distribution calculating step; and a step of binarizing the original image on the basis of the threshold value.

12. A method according to claim 11, wherein the comparing step includes:

a step of making a comparison using an X-direction differential filter that compares pixels adjacent to each other in the horizontal direction of a target pixel to compute the difference between them and a step of making a comparison using a Y-direction differential filter that compares pixels adjacent to each other in the vertical direction of the target pixel to compute the difference between them.

13. A method according to claim 11, wherein the threshold determining step includes:

a step of performing a differentiating process on each density value in the edge area for each pixels, the differentiating process counts "+1" on a lower density adjacent pixel, and counts "−1" on a higher density adjacent pixel; and a step of performing an integrating process on the result of the differentiating process so as to determine the density distribution.

14. A method according to claim 11, wherein the threshold determining step includes:

a processing step of performing a frequency adding process on lower density values and a frequency subtracting process on higher density values in comparing the densities in the edge area; and a step of performing an accumulating process on the results of the processing step for each density value.

15. A method according to claim 11, wherein the threshold determining step includes a step of determining a density value having the maximum frequency plus a constant value as the threshold value.

16. A method of binarizing images, comprising:

a step of comparing density values of target pixels composed of n×m pixels (n and m are each an integer of 1 or more) of an original multi-value image with density values of a plurality of surrounding pixels in vicinities of the target pixels and outputting a comparison result;

a step of judging on the basis of the comparison result whether or not the target pixels are isolated from the surrounding pixels when the target pixels are binarized in a binarization process using a predetermined threshold value;

a step of detecting the density values of the target pixels which make the target pixels isolated by the binarization process, when the judging step has judged that the target pixels are isolated;

a step of calculating accumulated isolated pixel frequencies of each and every density value detected by the detecting step when the judging step and the detecting step have finished each process for all of the original image;

a step of determining a threshold value on the basis of one of the density values having a minimum frequency from the accumulated isolated pixel frequencies calculated by the calculating step; and a step of binarizing the original image on the basis of the threshold value determined by the determining step.

17. A method according to claim 16, wherein the judging step includes:

a step of judging that the density value of the target pixels is the largest of the density values of the surrounding pixels; and a step of judging that the density value of the target pixels is the smallest of the density value of the surrounding pixels.

18. A method according to claim 16, wherein the threshold determining step includes:

a step of performing a differentiating process on each density value of the target pixels which makes the target pixels isolated by the binarization process, when the judging step has judged that the target pixels are isolated; and a step of performing an integrating process on a result of the differentiating process with respect to density.

19. A method according to claim 18, wherein the threshold determining step includes a step of determining a minimal value of the results of the integrating process as the threshold value.

20. A method according to claim 16, wherein the threshold determining step includes a first step of performing a frequency adding process on lower density values and a frequency subtracting process on higher density values, when the judging step has judged that the target pixels are isolated; and a second step of performing an integrating process on a result of the processes of the first step.

* * * * *